US009885399B2

(12) United States Patent
Khosravi et al.

(10) Patent No.: US 9,885,399 B2
(45) Date of Patent: Feb. 6, 2018

(54) ENGINE CRANKSHAFT INCLUDING A PLANETARY GEAR BALANCE UNIT

(71) Applicant: Ford Global Technologies, LLC, Dearborn, MI (US)

(72) Inventors: Maziar Khosravi, Cologne (DE); Stefan Quiring, Leverkusen (DE); Martin Lutz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/093,100

(22) Filed: Apr. 7, 2016

(65) Prior Publication Data

US 2016/0298722 A1    Oct. 13, 2016

(30) Foreign Application Priority Data

Apr. 8, 2015    (DE) .................. 10 2015 206 245

(51) Int. Cl.
| | |
|---|---|
| *F16F 15/26* | (2006.01) |
| *F16H 1/46* | (2006.01) |
| *F01B 9/04* | (2006.01) |
| *F01B 1/08* | (2006.01) |

(Continued)

(52) U.S. Cl.
CPC ............ *F16F 15/26* (2013.01); *F16H 1/46* (2013.01)

(58) Field of Classification Search
CPC .. F16F 15/22; F16F 15/26; F16F 15/28; F16F 15/262; F16H 1/46; F16H 3/666
See application file for complete search history.

(56) References Cited

U.S. PATENT DOCUMENTS

| | | | | |
|---|---|---|---|---|
| 672,013 | A | * | 4/1901 | Rydberg ................ F16H 1/46 254/344 |
| 4,320,671 | A | * | 3/1982 | Curasi ................... F16C 3/20 123/192.2 |
| 4,489,683 | A | | 12/1984 | Tsai et al. |

(Continued)

FOREIGN PATENT DOCUMENTS

| | | |
|---|---|---|
| DE | 112004000874 B4 | 4/2008 |
| DE | 102013203560 A1 | 9/2014 |

(Continued)

OTHER PUBLICATIONS

JP2003269541 A (machine translation), Fukagawa et al. (Sep. 2003).*

(Continued)

*Primary Examiner* — Jacob S Scott
*Assistant Examiner* — Tinh Dang
(74) *Attorney, Agent, or Firm* — Julia Voutyras; McCoy Russell LLP

(57) ABSTRACT

Methods and systems are provided for an engine crankshaft including an un-balanced mass coupled to a planetary gear set driven by the engine crankshaft. In one example, a system may include an engine crankshaft as a sun gear for a planetary gear set, with a single un-balanced mass coupled to an outer ring of the planetary gear set. In another example, a method may include driving an engine crankshaft in a first direction and driving an un-balanced mass coupled to an outer ring of a planetary gear set in a second direction opposite to the first direction, with rotation of the outer ring being driven by the engine crankshaft.

19 Claims, 7 Drawing Sheets

(51) Int. Cl.
  *F02B 75/06* (2006.01)
  *F16C 3/20* (2006.01)

(56) References Cited

U.S. PATENT DOCUMENTS

| | | | | |
|---|---|---|---|---|
| 8,210,148 B2* | 7/2012 | Morgan | ............... | F02B 75/06 |
| | | | | 123/192.1 |
| 8,281,763 B2* | 10/2012 | Namikoshi | ............... | F01B 1/08 |
| | | | | 123/193.6 |
| 8,348,806 B2* | 1/2013 | Baino | ............... | B60K 6/387 |
| | | | | 180/65.1 |
| 9,482,316 B2* | 11/2016 | Kurth | ............... | F16H 1/46 |
| 2011/0275477 A1* | 11/2011 | Hsieh | ............... | F16H 1/46 |
| | | | | 475/331 |
| 2014/0245985 A1 | 9/2014 | Lach et al. | | |

FOREIGN PATENT DOCUMENTS

| | | |
|---|---|---|
| DE | 102013213358 A1 | 1/2015 |
| EP | 2492541 A1 | 8/2012 |
| JP | 2003269541 A | 9/2003 |

OTHER PUBLICATIONS

Translation of Schlecht, Berthold, "Maschinenelemente 2: Getriebe, Verzahnungen, Lagerungen," München: Pearson Studium, 2010, p. 775, 777, 787, and 791-792, 16 pages.

* cited by examiner

ENGINE CRANKSHAFT INCLUDING A PLANETARY GEAR BALANCE UNIT

CROSS-REFERENCE TO RELATED APPLICATION

This application claims priority to German Patent Application No. 102015206245.7, filed Apr. 8, 2015, the entire contents of which are hereby incorporated by reference for all purposes.

FIELD

The present description relates generally to a crankshaft of an internal combustion engine.

BACKGROUND/SUMMARY

A vehicle drivetrain transfers motive power from a power source to vehicle wheels. An internal combustion engine is one example of a power source that includes a crankshaft. The crankshaft converts combustion energy from engine cylinders into rotational energy. In particular, combustion energy is transferred from the engine cylinders to pistons that linearly reciprocate. The pistons transfer the combustion energy to the crankshaft via rods, and the crankshaft converts the linear motion into rotational motion. The crankshaft may also include main bearing journals that are in mechanical communication with crankshaft bearings. The crankshaft bearings are captured between an engine block and the crankshaft. Lubrication flows from the engine block to the bearings, and the engine block supports the bearings and the crankshaft. The engine block and bearings allow the crankshaft and main bearing journals to rotate within the bearings.

In the design and layout of motor vehicles and internal combustion engines, increasing attention is being paid to vibrations. As part of noise design or sound design, vibrations are balanced, e.g. eliminated or compensated for. In some cases, individual vibrations of a specific frequency are isolated, filtered out or, where applicable, modeled. The crankshaft can be excited to rotary vibration by temporally changing rotary forces which are introduced into the crankshaft via the connecting rods pivoted on the individual crank journals. These rotary vibrations lead to noises both from body-borne sound emission and from body-borne sound introduced into the bodywork and into the internal combustion engine, wherein vibrations can also occur which negatively affect driving comfort, for example, vibrations of a steering wheel in a passenger compartment. When the crankshaft is excited in its inherent frequency range, high rotary vibration amplitudes can occur which can lead to engine degradation.

Attempts to address engine vibrational problems include adding balancing masses to the crankshaft to counteract the forces leading to engine vibration. One example approach is shown by the prior art DE 102013203560 A1. Therein, an internal combustion engine is disclosed including at least one cylinder and including a crank mechanism, in which a crankshaft mounted in a crankcase has an associated crankshaft throw for each cylinder. The crankshaft throws are arranged spaced apart from each other along a longitudinal axis of the crankshaft. At least one balance weight serving as an imbalance is arranged on the crankshaft, on an opposite side to at least one crankshaft throw, for the purpose of mass balancing. Another example approach is shown by U.S. Pat. No. 4,489,683 A in which a balancer, in particular for mass forces of second order, is disclosed for multi-cylinder engines wherein the balancer is arranged between throws of a crankshaft and includes an arrangement of planetary gears with balance units coupled to planet gears. The balancer is shown to include a rotationally fixed internal gear formed from a bulkhead of a crankcase, a rotationally fixed sun gear, and combinations thereof.

However, the inventors herein have recognized potential issues with such systems. As one example, balance weights arranged on a crankshaft may rotate at an un-adjustable rate relative to the rotation of the crankshaft. As a result, the engine vibrational effects at various engine speeds may not be adequately compensated by rotation of the balance weights.

In one example, the issues described above may be addressed by a method for a crankshaft, comprising: a shaft formed about a rotation axis, and at least one connecting rod bearing coupled to the shaft, wherein the crankshaft has at least one balance unit formed from a planetary gear set arranged concentrically to the shaft and at least one un-balanced mass attached to the planetary gear set, wherein the planetary gear set comprises a first stage and a second stage, wherein the first stage has a plurality of first planet gears, a first planet carrier and a first ring gear, and the second stage has a plurality of second planet gears, a second planet carrier and a second ring gear; wherein the shaft is configured as a sun gear of the planetary gear set, and wherein the first ring gear and the second planet carrier are connected together rotationally fixedly, and the at least one un-balanced mass is attached to the second ring gear. In this way, vibrational effects of an internal combustion engine may be compensated by the planetary gear set, and the rotation of the un-balanced mass may be determined via configuration of gear ratios of the planetary gear set. In some embodiments, rotation of the un-balanced mass may be adjustable by directly coupling the planetary gear set to a one-way clutch and a brake. In this way, the un-balanced mass of the planetary gear set may rotate at a rate asynchronous to a rotational rate of the crankshaft, and engine vibrational effects may be effectively compensated for a wide range of engine speeds.

The internal combustion engine with the crankshaft according to this arrangement balances out mass effects of its piston drive which occur in operation. The internal combustion engine therefore has fewer vibrations and in particular decreased rocking about a middle cylinder. The advantages of the internal combustion engine thus benefit a motor vehicle. The improved quietness of running of the internal combustion engine improves driving comfort of the motor vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-4 are shown to scale, although other relative dimensions may be used.

DETAILED DESCRIPTION

Figure 1:
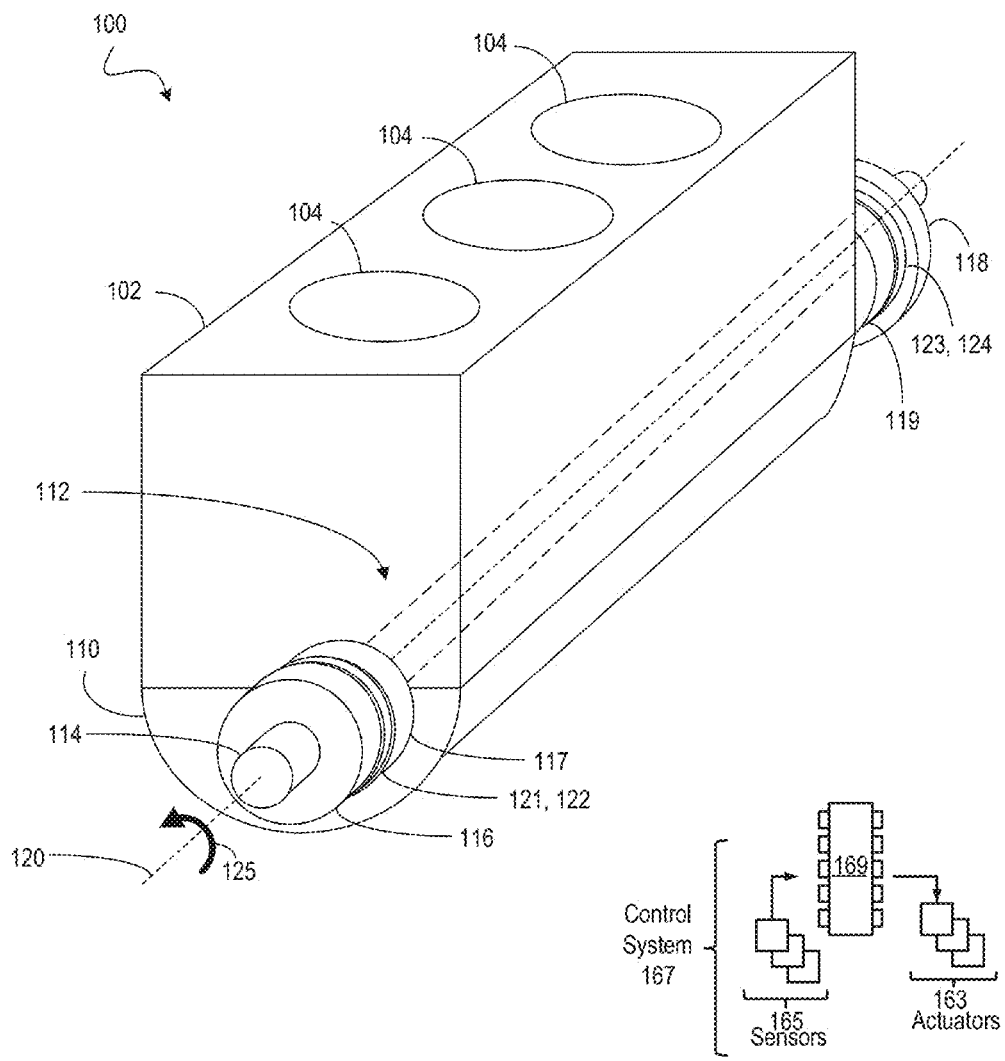
FIG. 1 shows a schematic diagram of a three cylinder in-line engine including an engine crankshaft.
Figure 2:
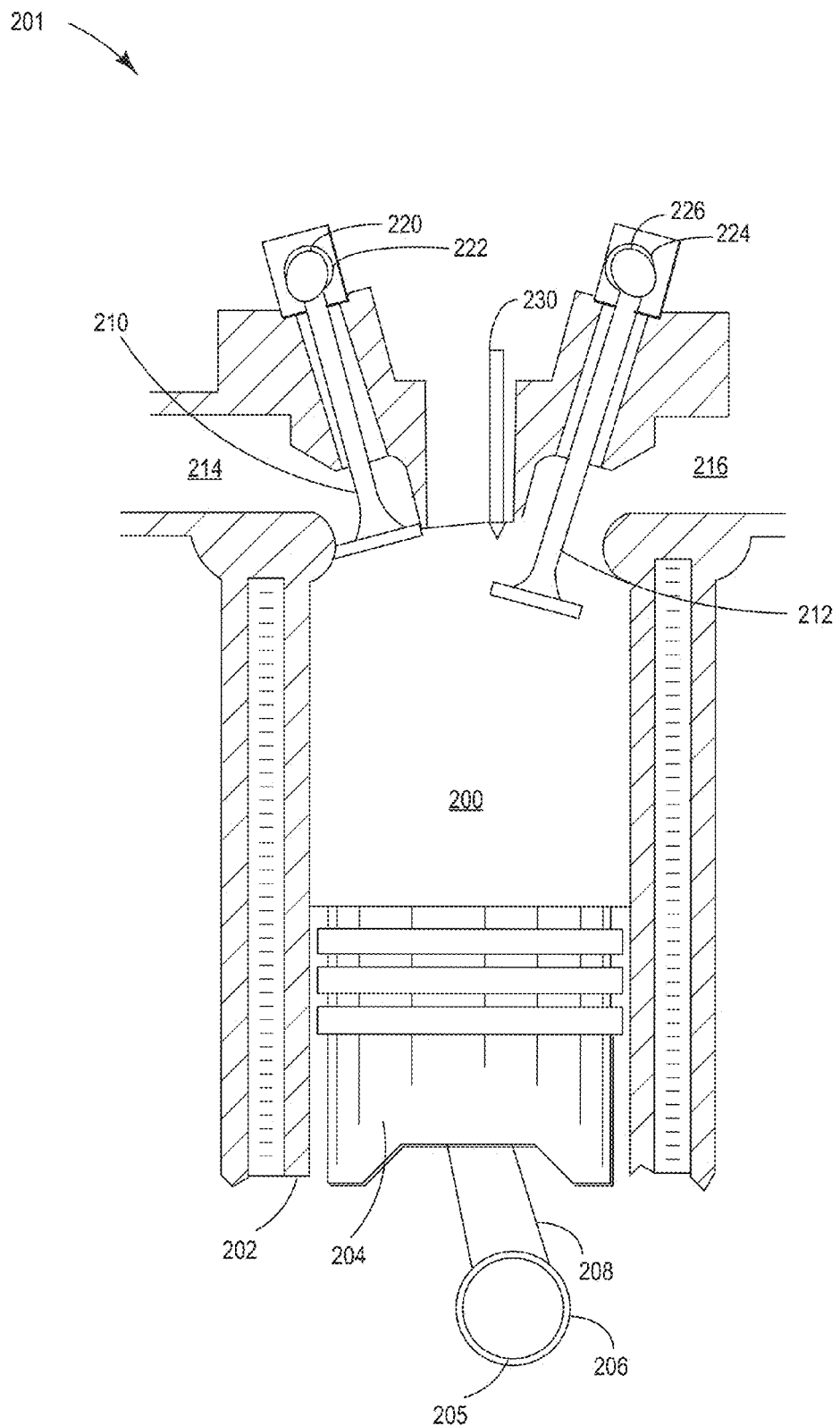
FIG. 2 shows a schematic diagram of a single cylinder of an engine.
Figure 3:
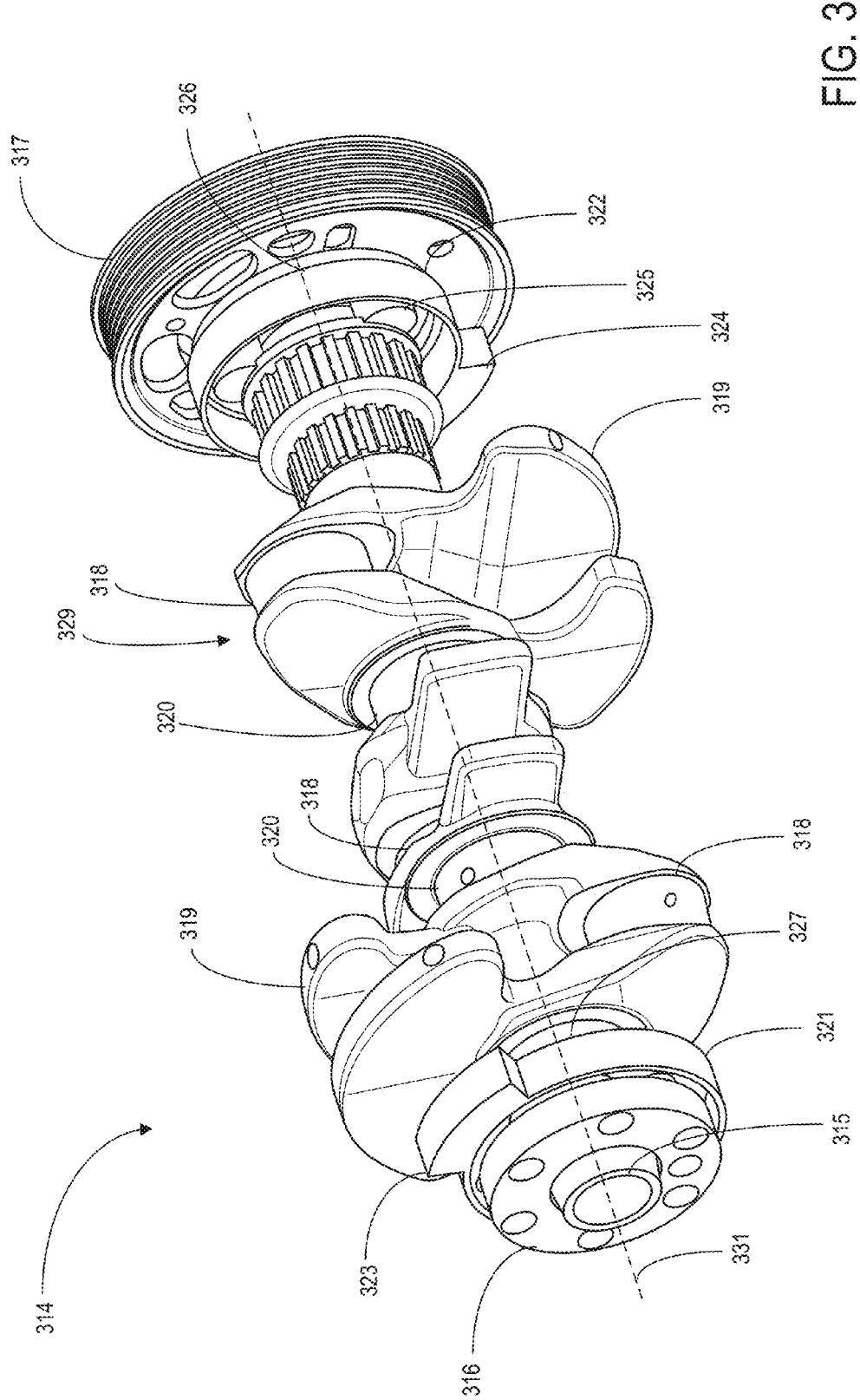
FIG. 3 shows a first embodiment of an engine crankshaft including a first balance unit located at a first end of the engine crankshaft, and a second balance unit located at a second end of the engine crankshaft.
Figure 4:
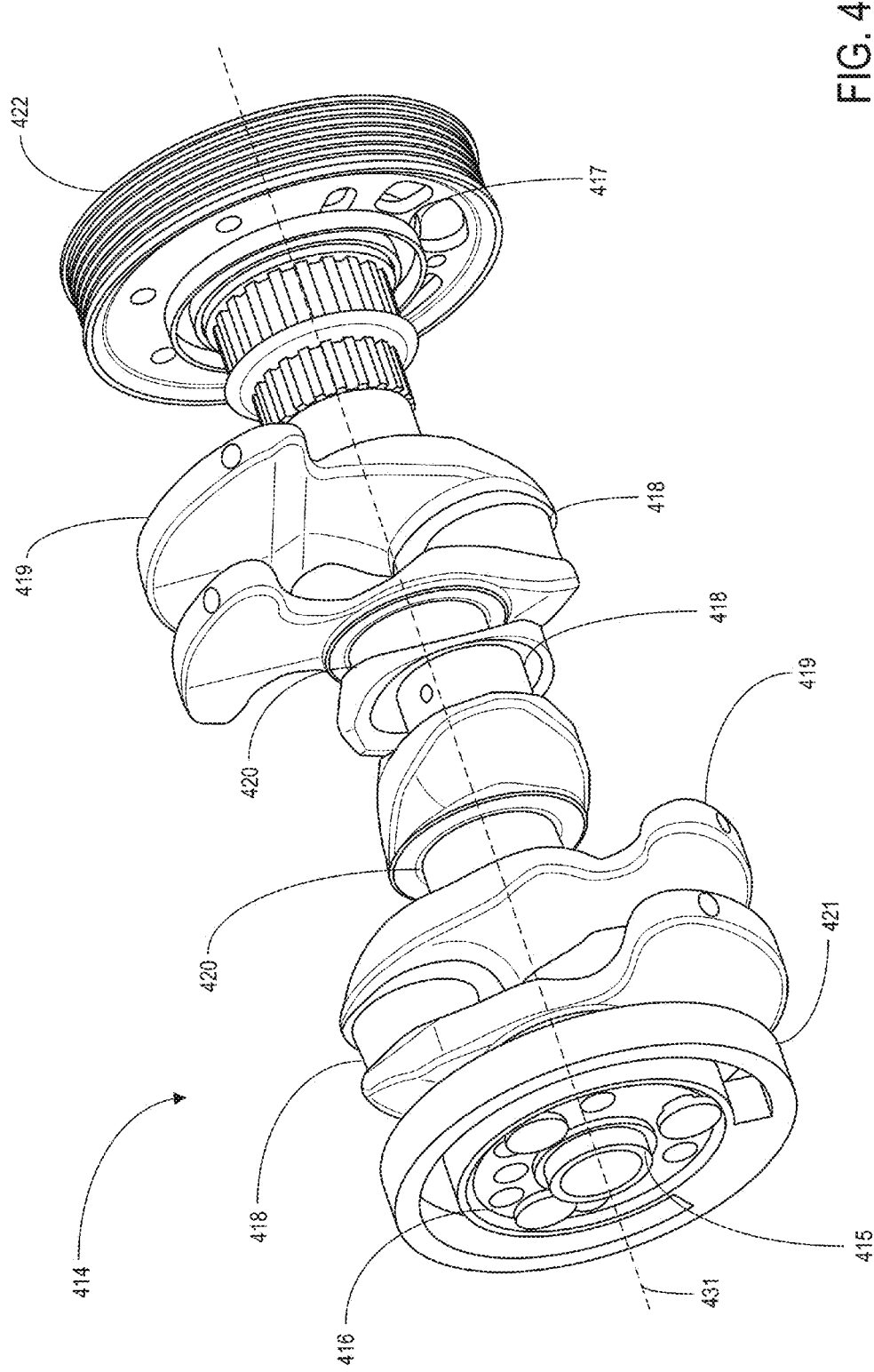
FIG. 4 shows a second embodiment of an engine crankshaft including a first balance unit integrated within a first function unit at a first end of the engine crankshaft, and a second balance unit integrated within a second function unit at a second end of the engine crankshaft.
Figure 5A:
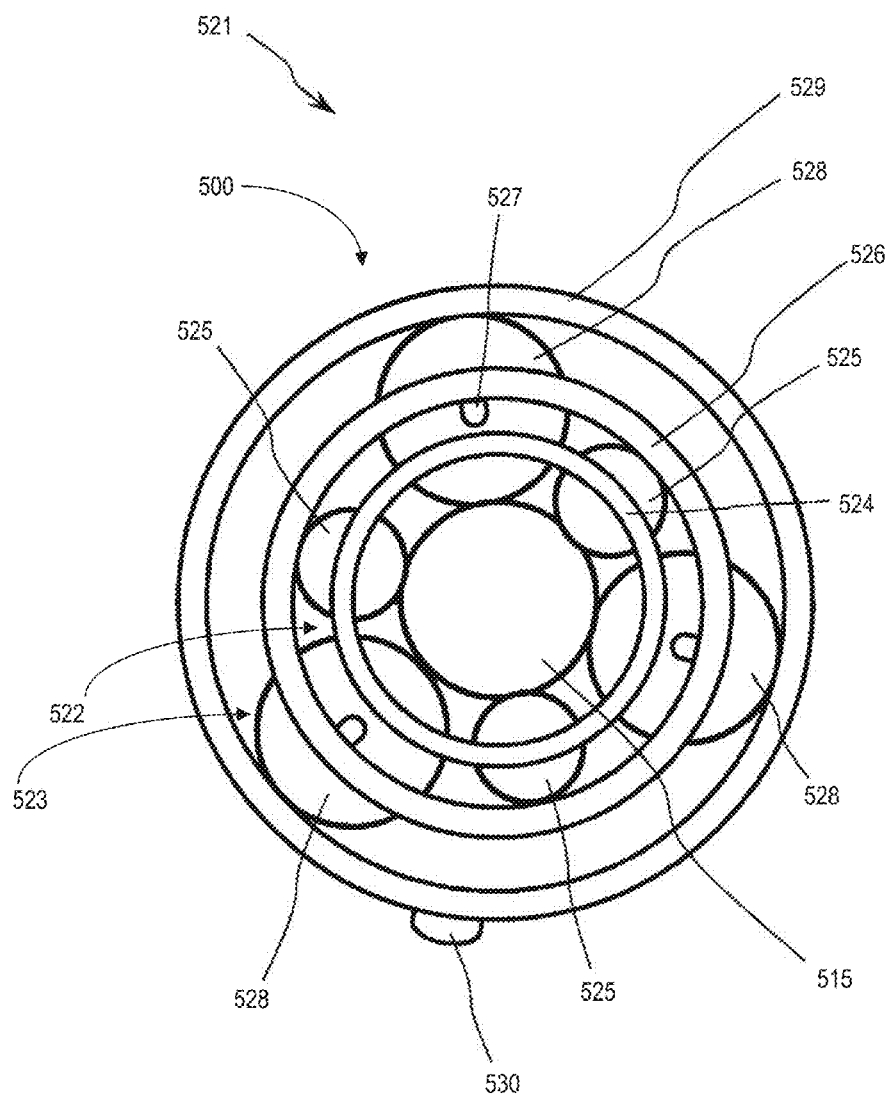
FIG. 5A shows an arrangement of gears within a balance unit of an engine crankshaft.
Figure 5B:
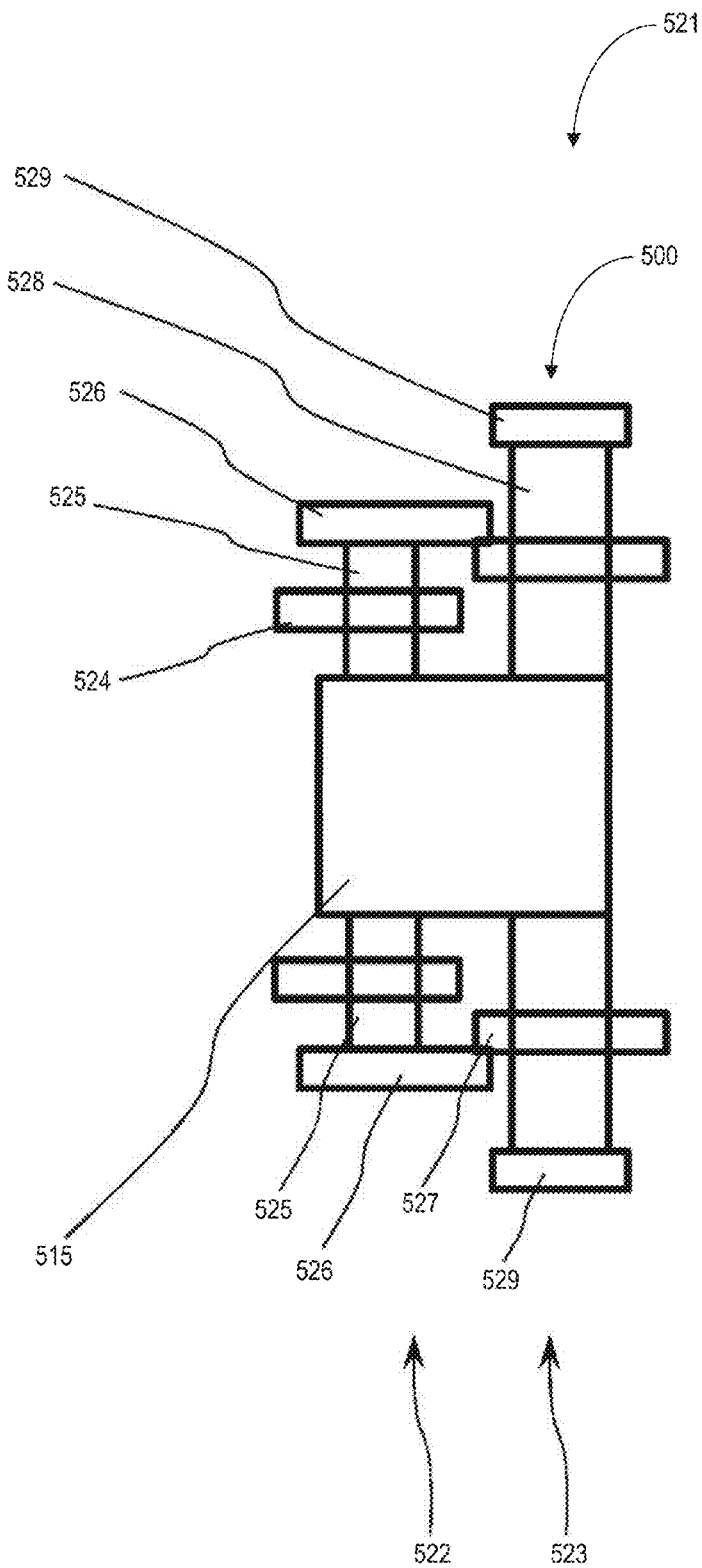
FIG. 5B shows an alternate view of the arrangement of gears within the balance unit of the engine crankshaft.
Figure 6:
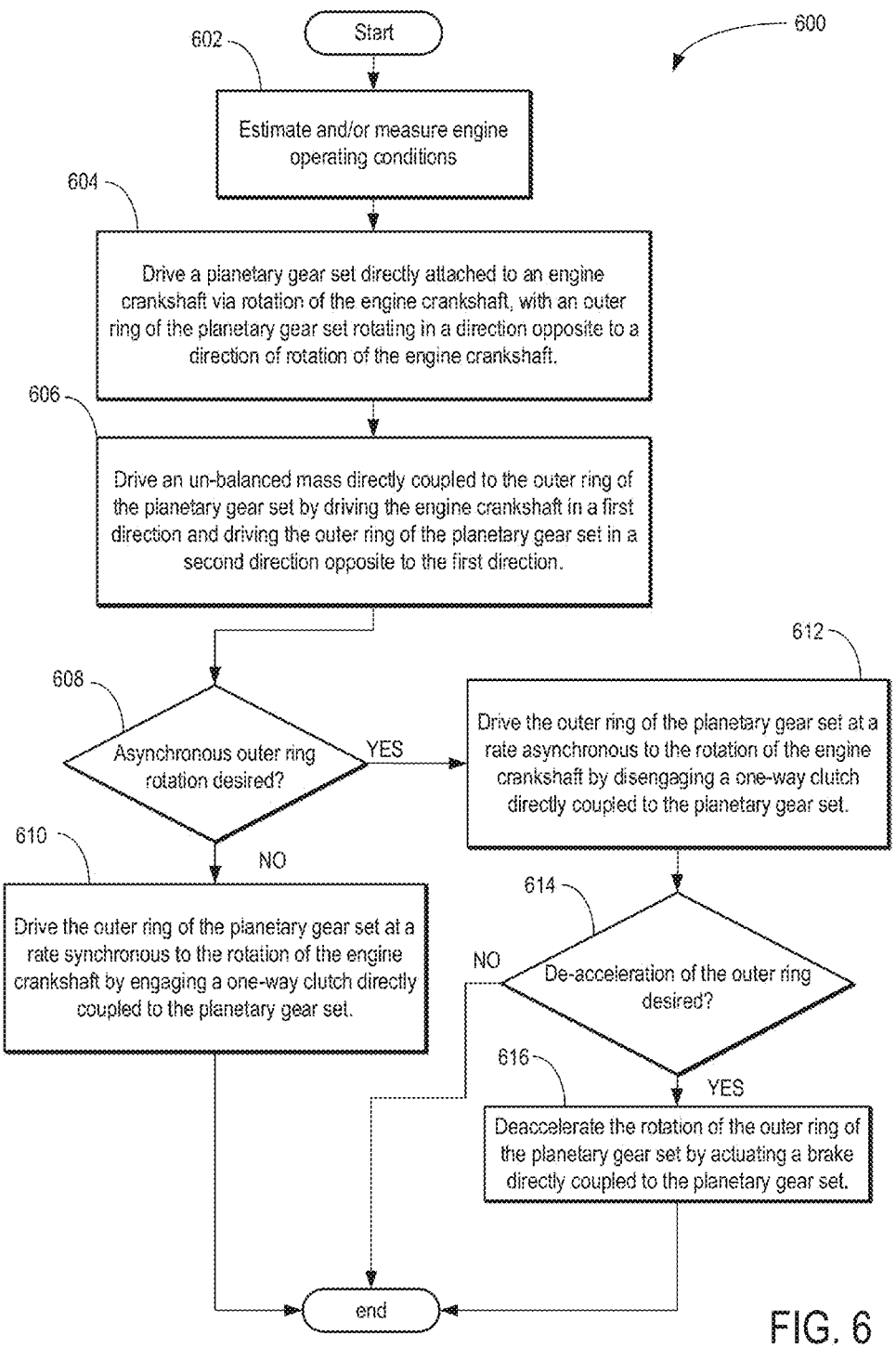
FIG. 6 shows a flowchart describing a method for driving a planetary gear set directly attached to an engine crankshaft via rotation of the engine crankshaft.

The following description relates to systems and methods for an engine crankshaft including at least one balance unit. The present disclosure is based on an object of at least reducing vibrational effects in an internal combustion engine. The engine crankshaft comprises a shaft formed about a rotation axis and at least one connecting rod bearing coupled to the shaft. The engine crankshaft is driven by cylinders of an engine, as shown by FIG. 1. Each cylinder of the engine includes one piston. Each piston is coupled to a first end of a connecting rod, as shown by FIG. 2. A second end of each connecting rod (opposite to the first end) is coupled to the engine crankshaft. The crankshaft includes at least one balance unit formed from a planetary gear set arranged concentrically to the shaft, as shown by FIGS. 3-4. Each balance unit includes an un-balanced mass coupled to (or formed by) an outer ring of the planetary gear set, as shown by FIGS. 3-4 and FIGS. 5A-5B. A first balance unit is located at a first end of the crankshaft and a second balance unit may be located at a second end of the crankshaft (opposite to the first end), as shown by FIGS. 3-4. Each balance unit may be integrated within a respective function unit coupled to the engine crankshaft, as shown by FIG. 4. Each planetary gear set forming each balance unit includes a sun gear, a plurality of planet gears, a plurality of ring gears, and a plurality of planet gear carriers, as shown by FIGS. 5A-5B. Each planetary gear set comprises a first stage and a second stage, wherein the first stage has a first plurality of planet gears, a first planet carrier, and a first ring gear, and the second stage has a second plurality of planet gears, a second planet carrier, and a second ring gear (e.g., outer ring), as shown by FIG. 5B. The engine crankshaft is configured as the sun gear of each planetary gear set. The first ring gear and the second planet carrier are connected together rotationally fixedly within each planetary gear set, and the un-balanced mass is attached to the outer ring within each planetary gear set. In fitted state, the first planet carrier is fixed rotationally stationary to the rotation axis of the engine crankshaft (e.g., the first planet carrier is arranged rotationally fixedly to a housing of the engine). A method of rotating the outer ring of each balance unit in a first direction may include rotating the engine crankshaft in a second direction opposite to the first direction, as shown by FIG. 6. In this way, the un-balanced mass of the outer ring may be rotated in the first direction opposite to the rotation of the crankshaft via the rotation of the outer ring in order to reduce engine vibration and increase engine performance.

The un-balanced mass constitutes an advantageous imbalance which can be used to counter vibrational effects in the internal combustion engine in which the crankshaft is fitted. On rotation of the engine crankshaft about the rotation axis, the un-balanced mass coupled to the outer ring moves in the opposite direction to the engine crankshaft.

In an advantageous embodiment of the engine crankshaft, the first planet gears each have half a radius of the sun gear, the first ring gear has twice the radius of the sun gear, the second planetary gears each have the same radius as the sun gear, and the outer ring has three times the radius of the sun gear. With this size ratio, it is possible for the outer ring to have a same rotation speed as the engine crankshaft when the engine crankshaft rotates about the rotation axis and the first planet carrier is fixed relative to the rotation axis. With two balance units rotating at the same speed as the engine crankshaft and in opposite directions to the engine crankshaft, vibrational effects of first order can be compensated in the internal combustion engine in which the engine crankshaft is fitted.

In a further advantageous embodiment of the engine crankshaft, the balance unit is integrated within the function unit of the engine crankshaft. The function unit may be a flange, a belt pulley, a flywheel, and/or the gears of the planetary gear set may be integrated within a front end accessory drive so that the gears may be utilized for an electrical motor and/or generator. In particular, the first balance unit is integrated within a first function unit and the second balance unit is integrated within a second function unit which is different from the first function unit.

Thus the crankshaft can be designed shorter and lighter in comparison with an embodiment in which balance units are placed separately on the shaft.

In a further advantageous embodiment of the crankshaft, the crankshaft has three connecting rod bearings. In particular an angle between two connecting rod bearings (e.g., throw angle) is 120°. The crankshaft is thus designed for three-cylinder engines and with the throw angles has a centrally symmetrical arrangement, which allows mutual elimination of free mass forces in the internal combustion engine in which the crankshaft is fitted. However, the crankshaft (including at least one balance unit) may also be adapted for engines including a different number of cylinders (such as two, five, etc.), with different throw angles for each engine.

Referring now to the figures, FIG. 1 shows a schematic representation of an internal combustion engine including a crankshaft. The engine 100 (which is shown by FIG. 1 as a three cylinder in-line engine) includes an engine block 102. The engine block 102 contains three cylinders 104, an example of which is shown in greater detail below in FIG. 2. Below (and formed by) engine block 102 is crankcase 110. Crankcase 110 houses crankshaft 112. The components of the crankshaft are further detailed below in FIGS. 3-4 and FIGS. 5A-5B. In FIG. 1, the crankshaft 112 includes shaft 114 and is shown to rotate about an axis of rotation 120 (along a length of the crankshaft 112 and central to the crankshaft 112) in a direction indicated by arrow 125.

In the example shown by FIG. 1, the crankshaft 112 includes a first function unit 116 and a second function unit 118. The first function unit 116 is arranged at a first end of the crankshaft 112 and is external to an interior of the engine block 102 and crankcase 110. The second function unit 118 is arranged at a second end (opposite to the first end) of the crankshaft 112 and is external to an interior of the engine block 102 and crankcase 110. The example of the crankshaft 112 shown by FIG. 1 also includes a first balance unit 117 arranged on the crankshaft 112 between the first function unit 116 and the engine 100, and a second balance unit 119 arranged on the crankshaft 112 between the second function unit 118 and the engine 100. In some embodiments of the crankshaft (e.g., such as the embodiment shown by FIG. 4) the first balance unit may be integrated within the first function unit (where the first function unit may be a radial seal, gears for an oil pump or camshaft, front end accessory drive, etc.) and the second balance unit may be integrated within the second function unit (where the second function unit may be a flywheel, pulley, etc.).

The crankshaft 112 also includes one-way clutches 121 and 123, as well as brakes 122 and 124. The one-way clutch 121 and brake 122 are directly coupled to first balance unit 117 while the one-way clutch 123 and brake 124 are directly coupled to second balance unit 119. The one-way clutches and the brakes may be actuated to control the rotational speed of each balance unit, as described below in the discussion of FIG. 6.

Several examples of existing components of the crankshaft on which balance units may be arranged are provided. However, these examples need not be limiting and there may be additional elements on the crankshaft that could be used to carry the balance units. Furthermore, the balance units may be their own separate components and not be arranged on or in connection to another component of the crankshaft. Additionally, the linear arrangement of components on the crankshaft may vary.

It should be understood that the balance unit of the present disclosure could be configured to balance the crank drive of many engine types including inline, v-engines, and flat engines with one of more cylinders. While engine 100 is depicted as an inline-three engine with three cylinders, it will be appreciated that other embodiments may include a different number of cylinders and arrangement of cylinders, such as V-6, I-4, I-6, V-12, opposed 4, and other engine types. Furthermore, the crank drive may contain additional elements not shown here. Additionally, elements depicted on crankshaft 112 may not be present in all engines that could be configured with the balance units of the present disclosure. For example, alternate embodiments of the crankshaft 112 shown by FIG. 1 may include only one balance unit.

FIG. 1 is an example schematic illustrating the approximate arrangement of the crankshaft relative to the components of the engine (e.g., the engine block, cylinders, and crankcase). The crankshaft and its components are not shown to scale. The positioning and size of the crankshaft may vary in embodiments (e.g., such as the embodiments shown by FIGS. 3-4). The crankshaft may additionally include other components, as shown by FIGS. 2-4 and FIGS. 5A-5B.

Engine 100 may be controlled at least partially by a control system 167 including controller 169 and by input from a vehicle operator via an input device (not shown). Control system 167 is configured to receive information from a plurality of sensors 165 (various examples of which are described herein) and sending control signals to a plurality of actuators 163. As one example, sensors 165 may include temperature sensors, pressure sensors, exhaust flow sensors, intake air sensors, engine speed sensors, particulate matter (PM) sensors, NOx sensors, oxygen sensors, ammonia sensors, hydrocarbon sensors, air/fuel ratio and composition sensors, etc. As another example, actuators 163 may include fuel injectors, intake valves, exhaust valves, and an intake throttle. Actuators 163 may also one-way clutch 121, one-way clutch 123, brake 122, and brake 124. Other actuators, such as a variety of additional valves and throttles, may be coupled to various locations of the engine 100. Controller 169 may receive input data from the various sensors, process the input data, and trigger the actuators in response to the processed input data based on instruction or code programmed therein corresponding to one or more routines.

Controller 169 may be a microcomputer, and may include a microprocessor unit, input/output ports, an electronic storage medium for executable programs and calibration values such as a read only memory chip, random access memory, keep alive memory, and/or a data bus. Controller 169 may receive various signals from sensors (not shown) coupled to engine 100, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type); throttle position (TP) from a throttle position sensor; absolute manifold pressure signal (MAP) from one or more intake and exhaust manifold sensors, cylinder air/fuel ratio from an exhaust gas oxygen sensor, and abnormal combustion from a knock sensor and a crankshaft acceleration sensor. Engine speed signal, RPM, may be generated by controller 169 from signal PIP. Manifold pressure signal MAP from a manifold pressure sensor may be used to provide an indication of vacuum, or pressure, in the intake manifold.

Storage medium read-only memory can be programmed with computer readable data representing instructions executable by a processor for, in combination with the various sensors, actuators, and other components described herein, performing the methods described below as well as other variants that are anticipated but not specifically listed. Example operations are shown with reference to FIG. 6, one or more parts of which may including one or more actions carried out by the control system in cooperation with the sensors, actuators, and/or other components described herein.

FIG. 2 shows an example cylinder of an internal combustion engine. Cylinder 201 may be one of the cylinders of an inline three cylinder engine, such as the engine shown in FIG. 1, or may be part of an engine of different configuration or cylinder number. Basic components of cylinder 201 include a combustion chamber 200. Combustion chamber 200 is where intake air is allowed into the cylinder 201 by intake valve 210 via intake port 214, and fuel is allowed into the cylinder 201 by fuel injector 230. Intake valve 210 is actuated by cam 220 coupled to rotatable camshaft 222. The intake air and fuel mix and converge in combustion chamber 200. Combustion of the air-fuel mixture in combustion chamber 200 forces piston 204 down along cylinder walls 202. Linear movement of piston 204 is translated to rotary motion of crankshaft 205 (e.g., such as crankshaft 112 shown by FIG. 1) via connecting rod 208 acting on connecting rod bearing 206. Combustion products leave combustion chamber 200 through exhaust port 216 when exhaust valve 212 is open. Exhaust valve 212 is actuated by cam 226 coupled to rotatable camshaft 224. For the system and method of the present disclosure, the internal combustion engine may be a compression ignition engine or spark ignition engine and can combust gasoline, ethanol, diesel or other fuel. In this way, the crankshaft 205 may rotate in accordance with the operation of a plurality of cylinders (e.g., such as cylinder 201) and convert energy from combustion products into crankshaft torque.

FIG. 3 shows a first embodiment of an engine crankshaft 314 including a first balance unit 321 and a second balance unit 322. The crankshaft 314 has a shaft 315 which is formed along a rotation axis 331. At least one connecting rod bearing 318 is arranged along the shaft 315. The at least one connecting rod bearing 318 is arranged coupled to the shaft 315. The shaft 315 is interrupted at the site of the at least one connecting rod bearing 318. In the embodiment of the crankshaft 314 shown by FIG. 3, the crankshaft 314 has three connecting rod bearings 318. The crankshaft 314 shown by FIG. 3 therefore has three throws 329. In alternate embodiments, the crankshaft 314 may for example also have a total of two connecting rod bearings 318 for mounting in an engine having two cylinders in line, a total of five connecting rod bearings 318 for mounting in an engine having five cylinders in line, etc.

The crankshaft 314 is optionally configured centrally symmetrical to the rotation axis 331. The connecting rod bearings 318 lie in a projection on a plane for which the rotation axis 331 is a normal, evenly distributed along a circle circumference. In the embodiment shown in FIG. 3, the crankshaft 314 has a crank throw angle of 120°. In the projection onto the plane for which the rotation axis 331 is a normal, the angle between two adjacent connecting rod bearings 318 of the three is 120°. In a two-throw embodiment with two connecting rod bearings 318, the crank throw angle of the crankshaft 314 according to the disclosure is optionally 180°, and with a five-throw embodiment with five connecting rod bearings 318, the crank throw angle of the crankshaft 314 according to the disclosure is optionally 72°. The connecting rod bearings 318 are optionally spaced evenly apart from each other along the rotation axis 331.

The embodiment of the crankshaft 314 shown in FIG. 3 has at least one counterweight 319 opposite at least one connecting rod bearing 318. The shaft 315 of the crankshaft 314 is formed as a bearing 320 at least at two points. These bearings 320 are configured for mounting the crankshaft 314 in an internal combustion engine (e.g., such as engine 100 shown by FIG. 1), in particular in a crankcase (e.g., such as crankcase 110 shown by FIG. 1) of the internal combustion engine.

The crankshaft 314 includes a first function unit 316 (e.g., a flange) at a first end of the crankshaft 314, adjacent to first balance unit 321. The crankshaft also includes a second function unit 317 (e.g., a pulley) at a second end of the crankshaft 314, adjacent to second balance unit 322. The first balance unit 321 includes a single un-balanced mass 323 coupled to an outer ring 327. The second balance unit 322 includes a single un-balanced mass 324 coupled to an outer ring 326. The first balance unit 321 and second balance unit 322 are formed by planetary gear sets (as described above, and as described below in reference to FIGS. 5A-5B). A plurality of planet gears 325 are shown included within the second balance unit 322.

FIG. 4 shows a second embodiment of an engine crankshaft 414 including a first balance unit 416 and a second balance unit 417, with the first balance unit 416 integrated within a first function unit 421 and the second balance unit 417 integrated within a second function unit 422. In this way, the form factor of the crankshaft 414 is reduced and the balance units 416 and 417 share a volume with the first and second function units 421 and 422, respectively.

The function units 421 and 422 are arranged concentrically to a shaft 415. The shaft 415 is formed along axis of rotation 431. In the embodiment shown FIG. 4, the first function unit 421 is a flange at one end of the crankshaft 414 and the second function unit 422 is a belt pulley at the opposite end of the crankshaft 414. The first and second function units 421 and 422 may also be wheels, gear wheels, flywheels, or similar. The balance units 416 and 417 of the crankshaft 414 are not arranged between the connecting rod bearings 418 but instead are outside the connecting rod bearings 418, concentric to the shaft 415.

The embodiment of the crankshaft 414 shown in FIG. 4 has at least one counterweight 419 opposite at least one connecting rod bearing 418. The shaft 415 of the crankshaft 414 is formed as a bearing 420 at least at two points. These bearings 420 are configured for mounting the crankshaft 414 in an internal combustion engine (e.g., such as engine 100 shown by FIG. 1), in particular in a crankcase (e.g., such as crankcase 110 shown by FIG. 1) of the internal combustion engine.

FIGS. 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIGS. 5A-5B show an arrangement of gears within a balance unit of an engine crankshaft, such as the balance units 321 or 322 shown by FIG. 3 or the balance units 416 and 417 shown by FIG. 4. FIG. 5A shows the balance unit 521 from a first view, and FIG. 5B shows the balance unit 521 from a second view approximately perpendicular to the first view. FIGS. 5A-5B show similar components and therefore components may be labeled similarly between FIGS. 5A-5B and not re-introduced. Additionally, the components shown by FIGS. 5A-5B are represented schematically and the scale, position, structure, etc. of the components shown by FIGS. 5A-5B may vary between embodiments.

Turning to FIG. 5A and FIG. 5B, the balance unit 521 of a crankshaft 515 according to the disclosure is shown schematically in a first view. The balance unit 521 is formed in particular from a two-stage planetary gear set 500. Planetary gear sets, also called epicyclic gear trains, are known in principle. In the embodiment shown in FIG. 5A, the planetary gear set 500 has a first stage 522 and a second stage 523 and is a rotationally symmetric planetary gear set. The crankshaft 515 is configured as a sun gear of both stages. The first stage 522 has first planet gears 525 carried by a first planet carrier 524, and a first ring gear 526. The first planet gears 525 are arranged around the crankshaft 515 (which may herein be referred to as the sun gear) and are in engagement with the crankshaft 515. The first ring gear 526 is arranged around the first planet gears 525 and is in engagement therewith. The second stage 523 has second planet gears 528 carried by a second planet carrier 527 and a second ring gear 529 (e.g., outer ring). The second planet gears 528 are arranged around the crankshaft 515 (e.g., the sun gear) and are in engagement with the crankshaft 515. The second ring gear 529 is arranged around the second planet gears 528 and is in engagement therewith. In particular, the first planet carrier 524 in mounted state is connected rotationally fixedly to a crankcase. The first ring gear 526 and the second planet carrier 527 are connected rotationally fixedly together. Because of the fixing of the first planet carrier relative to the engine (e.g., such as the engine 100 shown by FIG. 1) and the fixing of the first ring gear 526 relative to the second planet carrier 527, the second ring gear 529 rotates in the opposite direction to the crankshaft 515 when the crankshaft 515 rotates.

The gears 525, 526, 528, 529 in particular have a size ratio in which the first planet gears 525 each have a radius which is half as large as the radius of the sun gear 515, and the first ring gear 526 has a radius which is twice as large as the radius of the sun gear 515, and the second planet gears 528 each have a radius which is the same size as the radius of the sun gear 515, and the second ring gear 529 has a radius which is three times as large as the radius of the sun gear 15. With this ratio, the second ring gear 529 rotates at the same rotation speed as the crankshaft 515 when the crankshaft 515 rotates.

To balance out the mass effects in the engine, the balance unit 521 has exactly one balance mass 530. The balance mass 530 is dimensioned and arranged such that this counters the mass effects of the engine. In particular, the balance mass 530 is attached to the second ring gear 529 and counters a rocking moment about a middle cylinder of an internal combustion engine in which the crankshaft 514 is fitted.

FIG. 6 shows a method for driving a planetary gear set directly coupled to an engine crankshaft. Instructions for carrying out one or more actions of method 600 and the rest of the methods included herein may be executed by a controller based on instructions stored on a memory of the controller and/or in conjunction with signals received from sensors of the engine system, such as the sensors described above with reference to FIG. 1, and/or in conjunction with engine actuators of the engine system to adjust engine operation, according to the methods described below. Additionally, the Figure may illustrate actions carried out by the mechanical elements described herein.

At 602, the method includes estimating and/or measuring engine operating conditions. In one example, estimating and/or measuring engine operating conditions may be based on outputs of one or more temperature sensors, pressure sensors, etc. The engine operating conditions may also include engine speed and load, mass air flow rate, compressor inlet pressure, coolant flow rate, and/or other parameters based on measurements from sensors within an engine system. The measurement of engine operating conditions may also include engine torque demand, cylinder temperature, crankshaft rotational speed, and/or planetary gear set rotational speed.

At 604, the method includes driving the planetary gear set directly attached to the engine crankshaft via rotation of the engine crankshaft, with an outer ring of the planetary gear set rotating in a direction opposite to a direction of rotation of the engine crankshaft. For example, the engine crankshaft may form a sun gear of the planetary gear set. The sun gear may drive a first set of planet gears of the planetary gear set to individually rotate in a direction opposite to the rotation of the sun gear, where the first set of planet gears is coupled to a first carrier rotationally fixed (e.g., not rotating) relative to the sun gear (e.g., the engine crankshaft). The sun gear may additionally drive a second set of planet gears in a direction opposite to the rotation of the sun gear, where the second set of planet gears is coupled to a second carrier not rotationally fixed (e.g., able to rotate) relative to the sun gear (e.g., the engine crankshaft). The second set of planet gears may drive an outer ring of the planetary gear set in a direction opposite to the rotation of the sun gear. Additionally, the first set of planet gears may drive the second carrier of the second set of planet gears to rotate in a direction opposite to the rotation of the sun gear. In this way, the outer ring is driven by the rotation of the second carrier in a direction opposite to the rotation of the crankshaft, and is additionally driven by the rotation of the second set of planet gears in a direction opposite to the rotation of the crankshaft.

At 606, the method includes driving an un-balanced mass directly coupled to the outer ring of the planetary gear set by driving the engine crankshaft in a first direction and driving the outer ring of the planetary gear set in a second direction opposite to the first direction. In an example, the outer ring of the planetary gear set includes a single un-balanced mass coupled to an outer circumferential surface of the outer ring. As the outer ring rotates in a direction opposite to the rotation of the crankshaft as described above, the outer ring also drives the single un-balanced mass in a direction opposite to the rotation of the crankshaft.

At 608, the method includes determining whether an asynchronous rotation of the outer ring of the planetary gear set is desired. As an example, the controller may determine that rotating the un-balanced mass (via rotation of the outer ring as described above) in a direction opposite to the rotation of the crankshaft and at a different rotational speed than the rotation of the crankshaft may be advantageous to increase engine performance (e.g., reduce engine vibrations or increase engine torque). The determination may be based on the measurement of engine operating conditions as described above.

If a determination is made at 608 to not rotate the outer ring of the planetary gear set asynchronously, the method continues to 610 where the method includes driving the outer ring of the planetary gear set at a rate synchronous to the rotation of the engine crankshaft by engaging a one-way clutch directly coupled to the planetary gear set. For example, the controller may have determined at 608 that rotating the un-balanced mass at the same rate as the rotation of the crankshaft is advantageous for a reduction in engine vibrations based on engine operating conditions. The controller then engages the one-way clutch via an actuator, such as a hydraulic or electromagnetic actuator, or maintains the engagement of the one-way clutch, so that the crankshaft may drive the gears of the planetary gear set as described above.

If a determination is made at 608 to rotate the outer ring of the planetary gear set asynchronously, the method continues to 612 where the method includes driving the outer ring of the planetary gear set at a rate asynchronous to the rotation of the engine crankshaft by disengaging a one-way clutch, via an actuator coupled to the clutch, the clutch directly coupled to the planetary gear set. For example, the rotation of the outer ring (and the single un-balanced mass) by the crankshaft reduces the net torque output of the engine crankshaft due to the increased effective mass of the crankshaft. As a result, the controller may have determined at 608 that rotating the un-balanced mass at a different rate than the rotation of the crankshaft is advantageous for an increase in engine torque output based on engine operating conditions. As a second example, the controller may have determined at 608 that rotating the outer ring (and the single un-balanced mass) at a rate different than the rotation of the crankshaft may be advantageous for reducing engine vibrations based on engine operating conditions. In both the first and second examples, the controller then disengages the one-way clutch, or maintains the disengagement of the one-way clutch, so that the crankshaft may not drive the gears of the planetary gear set.

The method then continues to 614 where the method includes determining whether de-acceleration of the outer ring is desired. As an example, de-acceleration of the outer ring of the planetary gear set may be determined to be desired by the controller for increasing engine performance based on engine operating conditions by reducing the rotational speed of the un-balanced mass, particularly when the un-balanced mass is rotating at an increased rate relative to the rotation of the crankshaft. This condition may occur, for example, following a sudden reduction in engine torque demand.

If de-acceleration of the outer ring is desired at 614, the method continues to 616 where the method includes de-accelerating the rotation of the outer ring of the planetary gear set by actuating a brake directly coupled to the planetary gear set via an actuator coupled to the brake. For example, the controller may actuate the brake to apply a force to the outer ring of the planetary gear set in order to decrease the rotational speed of the outer ring (and the coupled un-balanced mass).

In this way, un-balanced mass coupled to the outer ring of the planetary gear set may rotate in a direction opposite to the rotation of the crankshaft in order to reduce engine vibrations. Additionally, the rotational speed of the un-balanced mass may be selectively determined based on engine operating conditions and the engagement or disengagement of the one-way clutch and/or brake. By controlling the rotational speed of the outer ring, the un-balanced mass may provide an advantageous reduction in engine vibrations for a wide range of engine operating conditions, thereby increasing engine performance. Engine performance may also be increased by selectively disengaging the rotation of the outer ring via the one-way clutch, thereby reducing the effective mass of the crankshaft and increasing net engine torque.

In one embodiment, a crankshaft includes a shaft formed about a rotation axis, and at least one connecting rod bearing coupled to the shaft, wherein the crankshaft has at least one balance unit formed from a planetary gear set arranged concentrically to the shaft and at least one un-balanced mass attached to the planetary gear set, wherein the planetary gear set comprises a first stage and a second stage, wherein the first stage has a plurality of first planet gears, a first planet carrier and a first ring gear, and the second stage has a plurality of second planet gears, a second planet carrier and a second ring gear; wherein the shaft is configured as a sun gear of the planetary gear set, and wherein the first ring gear and the second planet carrier are connected together rotationally fixedly, and the at least one un-balanced mass is attached to the second ring gear. In a first example of the crankshaft, the first planet gears each have a radius half of a radius of the sun gear of the planetary gear set, wherein the first ring gear has a radius twice the radius of the sun gear of the planetary gear set, wherein the second planet gears each have a same radius as the radius of the sun gear of the planetary gear set, and wherein the second ring gear has a radius three times the radius of the sun gear of the planetary gear set. A second example of the crankshaft optionally includes the first example and further includes wherein the crankshaft has at least one function unit and the at least one balance unit is integrated in the at least one function unit. A third example of the crankshaft optionally includes one or more or both of the first and second examples, and further includes wherein the crankshaft has three connecting rod bearings and wherein an angle between two connecting rod bearings is 120°. A fourth example of the crankshaft optionally includes one or more or each of the first through third examples, and further includes wherein the first planet carrier is arranged rotationally fixedly to a housing of an internal combustion engine.

In one embodiment, a system includes an engine crankshaft of an internal combustion engine; and a first planetary gear set directly coupled to and driven by the engine crankshaft, wherein the first planetary gear set includes a first outer ring, and wherein the first outer ring rotates in a direction opposite to rotation of the engine crankshaft. In a first example of the system, the system includes exactly two planetary gear sets including the first planetary gear set and a second planetary gear set directly coupled to and driven by the engine crankshaft, wherein the second planetary gear set includes a second outer ring, and wherein the second outer ring rotates in a direction opposite to rotation of the engine crankshaft. A second example of the system optionally includes the first example and further includes wherein the first outer ring and the second outer ring rotate at a same speed as the crankshaft. A third example of the system optionally includes one or more or both of the first and second examples, and further includes wherein rotation of the first outer ring and the second outer ring is driven by the engine crankshaft. A fourth example of the system optionally includes one or more or each of the first through third examples, and further includes wherein the crankshaft forms a sun gear of the first planetary gear set and the second planetary gear set. A fifth example of the system optionally includes one or more or each of the first through fourth examples, and further includes wherein the sun gear of the first and second planetary gear sets rotates in an opposite direction to the first and second outer rings. A sixth example of the system optionally includes one or more or each of the first through fifth examples, and further includes wherein the first and second planetary gear sets are rotationally symmetric planetary gear sets. A seventh example of the system optionally includes one or more or each of the first through sixth examples, and further includes wherein the first outer ring includes exactly one first un-balanced mass, and the second outer ring includes exactly one second un-balanced mass. An eighth example of the system optionally includes one or more or each of the first through seventh examples, and further includes wherein the exactly one first un-balanced mass is directly coupled to an outer circumferential surface of the first outer ring of the first planetary gear set, and wherein the exactly one second un-balanced mass is directly coupled to an outer circumferential surface of the second outer ring of the second planetary gear set. A ninth example of the system optionally includes one or more or each of the first through eighth examples, and further includes wherein a sun gear of the first and second planetary gear sets does not have any un-balanced masses. A tenth example of the system optionally includes one or more or each of the first through ninth examples, and further includes wherein the system includes a one-way clutch and a brake directly coupled to the first and second planetary gear sets.

In one embodiment, a method includes driving a planetary gear set directly attached to an engine crankshaft via rotation of the engine crankshaft, with an outer ring of the planetary gear set rotating in a direction opposite to a direction of rotation of the engine crankshaft. In a first example of the method, the method includes driving an un-balanced mass directly coupled to the outer ring of the planetary gear set includes driving the engine crankshaft in a first direction and driving the outer ring of the planetary gear set in a second direction opposite to the first direction. A second example of the method optionally includes the first example and further includes driving the outer ring of the planetary gear set at a rate asynchronous to the rotation of the engine crankshaft by disengaging a one-way clutch directly coupled to the planetary gear set. A third example of the method optionally includes one or more or both of the first and second examples, and further includes deaccelerating the rotation of the outer ring of the planetary gear set by actuating a brake directly coupled to the planetary gear set.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A crankshaft, comprising:
a shaft formed about a rotation axis, and at least one connecting rod bearing coupled to the shaft, wherein the crankshaft has at least one balance unit formed from a planetary gear set arranged concentrically to the shaft and at least one un-balanced mass attached to the planetary gear set, wherein the planetary gear set comprises a first stage and a second stage, wherein the first stage has a plurality of first planet gears, a first planet carrier, and a first ring gear, and the second stage has a plurality of second planet gears, a second planet carrier, and a second ring gear; wherein the shaft is configured as a sun gear of the planetary gear set, and wherein the first ring gear and the second planet carrier are connected together rotationally fixedly, and the at least one un-balanced mass is attached to the second ring gear.

2. The crankshaft of claim 1, wherein the plurality of first planet gears each has a radius half of a radius of the sun gear of the planetary gear set, wherein the first ring gear has a radius twice the radius of the sun gear of the planetary gear set, wherein the plurality of second planet gears each has a same radius as the radius of the sun gear of the planetary gear set, and wherein the second ring gear has a radius three times the radius of the sun gear of the planetary gear set.

3. The crankshaft of claim 1, wherein the crankshaft has at least one function unit and the at least one balance unit is integrated in the at least one function unit.

4. The crankshaft of claim 1, wherein the crankshaft has three connecting rod bearings and wherein an angle between two connecting rod bearings is 120°.

5. The crankshaft of claim 1, wherein the first planet carrier is arranged rotationally fixedly to a housing of an internal combustion engine.

6. A system comprising:
an engine crankshaft;
a first planetary gear set directly coupled to and driven by the engine crankshaft, wherein the first planetary gear set includes a first outer ring, and wherein the first outer ring rotates in a direction opposite to rotation of the engine crankshaft; and
a second planetary gear set directly coupled to and driven by the engine crankshaft, wherein the second planetary gear set includes a second outer ring, and wherein the second outer ring rotates in a direction opposite to the rotation of the engine crankshaft.

7. The system of claim 6, wherein the first outer ring and the second outer ring rotate at a same speed as the crankshaft.

8. The system of claim 7, wherein rotation of the first outer ring and the second outer ring is driven by the engine crankshaft.

9. The system of claim 8, wherein the engine crankshaft forms a sun gear of the first planetary gear set and the second planetary gear set.

10. The system of claim 9, wherein the sun gear of the first and second planetary gear sets rotates in an opposite direction to the first and second outer rings.

11. The system of claim 10, wherein each of the first and second planetary gear sets is equally spaced with respect to a rotation axis of the engine crankshaft.

12. The system of claim 11, wherein the first outer ring includes exactly one first un-balanced mass, and the second outer ring includes exactly one second un-balanced mass.

13. The system of claim 12, wherein the exactly one first un-balanced mass is directly coupled to an outer circumferential surface of the first outer ring of the first planetary gear set, and wherein the exactly one second un-balanced mass is directly coupled to an outer circumferential surface of the second outer ring of the second planetary gear set.

14. The system of claim 13, wherein the sun gear of the first and second planetary gear sets does not have any un-balanced masses.

15. The system of claim 14, wherein the system includes a one-way clutch and a brake directly coupled to the first and second planetary gear sets.

16. A method comprising:
    driving a planetary gear set directly attached to an engine crankshaft via rotation of the engine crankshaft, with an outer ring of the planetary gear set rotating in a direction opposite to a direction of rotation of the engine crankshaft, and
    driving an un-balanced mass directly coupled to the outer ring of the planetary gear set, which includes driving the engine crankshaft in a first direction and driving the outer ring of the planetary gear set in a second direction opposite to the first direction.

17. The method of claim 16, further comprising driving the outer ring of the planetary gear set at a rate asynchronous to the rotation of the engine crankshaft by disengaging a one-way clutch directly coupled to the planetary gear set.

18. The method of claim 17, further comprising decelerating rotation of the outer ring of the planetary gear set by actuating a brake directly coupled to the planetary gear set.

19. A method comprising:
    driving a planetary gear set directly attached to an engine crankshaft via rotation of the engine crankshaft and driving an un-balanced mass directly coupled to an outer ring of the planetary gear set, including driving the engine crankshaft in a first direction and driving the outer ring of the planetary gear set in a second direction opposite to the first direction.

* * * * *